(12) United States Patent
Blackwell

(10) Patent No.: US 10,414,220 B2
(45) Date of Patent: Sep. 17, 2019

(54) RECOVERY TOW HITCH ASSEMBLY

(71) Applicant: Shane Blackwell, Bridport (AU)

(72) Inventor: Shane Blackwell, Bridport (AU)

(*) Notice: Subject to any disclaimer, the term of this patent is extended or adjusted under 35 U.S.C. 154(b) by 0 days.

(21) Appl. No.: 16/063,949

(22) PCT Filed: Aug. 11, 2017

(86) PCT No.: PCT/AU2017/050849
§ 371 (c)(1),
(2) Date: Jun. 19, 2018

(87) PCT Pub. No.: WO2018/027277
PCT Pub. Date: Feb. 15, 2018

(65) Prior Publication Data
US 2019/0217676 A1    Jul. 18, 2019

(30) Foreign Application Priority Data
Aug. 11, 2016 (AU) ................ 2016903157

(51) Int. Cl.
*B60D 1/50* (2006.01)
*B60D 1/06* (2006.01)
(Continued)

(52) U.S. Cl.
CPC ............ *B60D 1/50* (2013.01); *B60D 1/06* (2013.01); *B60D 1/155* (2013.01); *B60D 1/249* (2013.01);
(Continued)

(58) Field of Classification Search
CPC . B60D 1/50; B60D 1/06; B60D 1/155; B60D 1/52; B60D 1/249; B60D 1/32; B60D 1/34
See application file for complete search history.

(56) References Cited

U.S. PATENT DOCUMENTS 1,654,939 A    1/1928  Albert
3,236,515 A *  2/1966  Ackerman ............... A61G 7/00
                                                            188/300
(Continued)

FOREIGN PATENT DOCUMENTS

CN    105564166 A    5/2016
DE      9320103 U1   6/1994
(Continued)

OTHER PUBLICATIONS

International Search Report & Written Opinion dated Oct. 26, 2017 from PCT Application No. PCT/AU2017/050849.

*Primary Examiner* — Kevin Hurley
*Assistant Examiner* — Marlon A Arce
(74) *Attorney, Agent, or Firm* — Innovation Capital Law Group, LLP; Vic Lin

(57) ABSTRACT

There is provided herein a recovery tow hitch assembly which may be utilized in a standard configuration much like a conventional tow hitch assembly. However, during bogging, a locking mechanism may be unlocked so as to free a sliding member slidably retained within a sleeve. A compression member acts between the sliding member and the sleeve such that, when unlocked, the vehicle may be driven forwards free of trailer tow load until such time that the compression member acts on the extended sliding member to pull the trailer free. In embodiments, at the full extent of travel of the sliding member, the present tow hitch assembly initially jerks the trailer under the inertia of the vehicle and wherein the potential energy stored within the compression member further assist the freeing of the trailer wheels.

15 Claims, 8 Drawing Sheets

(51) Int. Cl.
*B60D 1/155* (2006.01)
*B60D 1/32* (2006.01)
*B60D 1/52* (2006.01)
*B60D 1/24* (2006.01)
*B60D 1/34* (2006.01)

(52) U.S. Cl.
CPC ............... *B60D 1/32* (2013.01); *B60D 1/34* (2013.01); *B60D 1/52* (2013.01)

(56) References Cited

U.S. PATENT DOCUMENTS

| | | | | |
|---|---|---|---|---|
| 3,649,048 | A | * | 3/1972 | Garnett ................ B60D 1/155 |
| | | | | 280/416.1 |
| 4,191,280 | A | | 3/1980 | Copperwheat |
| 4,254,966 | A | * | 3/1981 | Mitchell ................ B60D 1/50 |
| | | | | 260/1 |
| 6,131,937 | A | * | 10/2000 | Coenen ................ A01B 59/004 |
| | | | | 172/450 |
| 9,480,197 | B2 | * | 11/2016 | Heitlinger ............ A01B 59/041 |
| 9,763,378 | B2 | * | 9/2017 | Redekop ............. A01B 73/067 |

FOREIGN PATENT DOCUMENTS

| | | | |
|---|---|---|---|
| FR | 525619 | A | 9/1921 |
| GB | 2059896 | A | 4/1981 |
| GB | 2275664 | A | 9/1994 |

\* cited by examiner

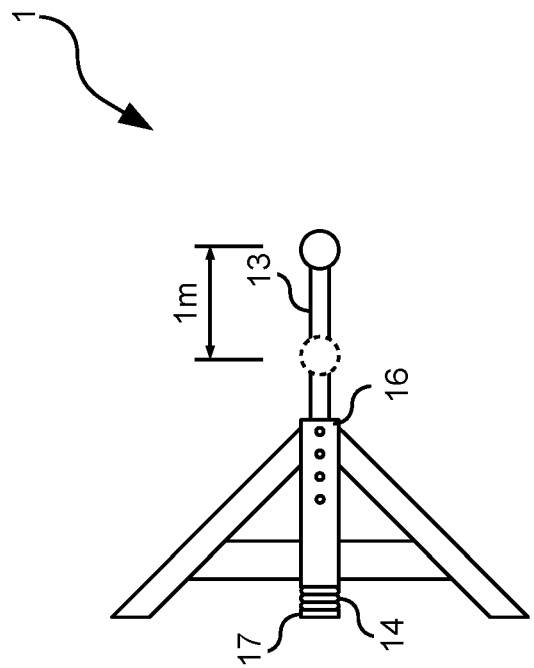
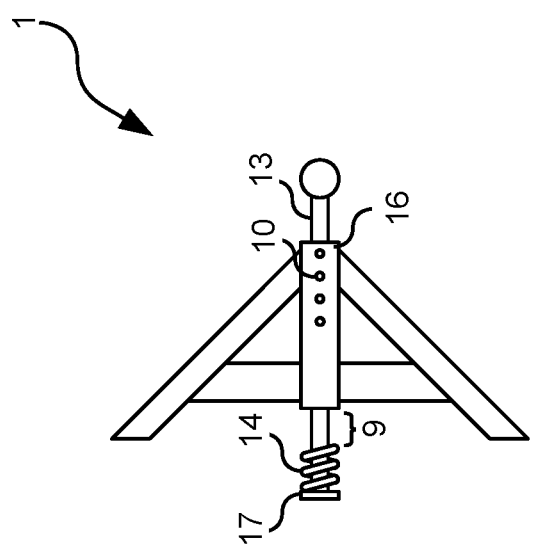

RECOVERY TOW HITCH ASSEMBLY

FIELD OF THE INVENTION

This invention relates to a tow hitch assembly and, more particularly, to a tow hitch assembly for bogged vehicle and trailer recovery.

BACKGROUND OF THE INVENTION

Towing trailers in mud, sand and the like may cause the vehicle wheels to bog down wherein the associated trailer tow load hinders freeing of the wheels from their depressions causing both vehicle and trailer to become immovably stuck, requiring manual digging, utilisation of traction plates and the like.

Conventional arrangements for freeing bogged vehicles and trailers involve utilisation of elastic "bungee" cords which store potential energy for jerking trailers free.

However, bungee cords cannot be used for continual towing and are used only during bogging. Furthermore, bungee cords are inconvenient to deploy, typically requiring decoupling of the trailer.

Furthermore, bungee cords are dangerous in that tow balls have been known to shear from the hitch assembly under excessive forces, thereby become dangerous projectiles.

The present invention seeks to provide a mechanism which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a recovery tow hitch assembly which may be utilised in a standard configuration much like a conventional tow hitch assembly. However, during bogging, a locking mechanism may be unlocked so as to free a sliding member slidably retained within a sleeve.

A compression member acts between the sliding member and the sleeve such that, when unlocked, the vehicle may be driven forwards free of trailer tow load until such time that the compression member acts on the extended sliding member to pull the trailer free. In embodiments, at the full extent of travel of the sliding member, the present tow hitch assembly initially jerks the trailer under the inertia of the vehicle and wherein the potential energy stored within the compression member further assist the freeing of the trailer wheels.

In embodiments, the present tow hitch assembly is configured so as to allow the vehicle to escape prior applying trailer tow loads, thereby effectively allowing the vehicle to be freed independent of the trailer. Such configuration may take into account the radius of the vehicle wheels such that the present tow hitch assembly allows the vehicle wheels to escape their respective depressions prior applying trailer tow load forces.

Furthermore, in embodiments, the present tow hitch assembly allows for extensions of up to approximately 1600 mm utilising a telescopic arrangement.

As such, with the foregoing in mind, in accordance with one embodiment, there is provided a recovery tow hitch assembly comprising: an elongate sliding member having a slidably retained within a vehicle affixed sleeve, the sliding member having a hitch fastener at a distal end thereof and a stop at an opposite proximal end; a compression member operative between the stop and the sleeve; and a locking mechanism for locking the tow hitch assembly in a standard configuration wherein the sliding member is locked relative to the sleeve and wherein, when the locking mechanism is unlocked, the tow hitch assembly assumes a recovery configuration wherein the sliding member is able to slide with respect to the sleeve and wherein tow pulling force applied to the hitch fastener pulls the sliding member from the sleeve to compress the compression member between the stop and the sleeve.

The compression member may comprise a non-compressed length and wherein, in the standard configuration, the non-compressed length may be configured to leave a gap between the distal end of the compression member and the sleeve.

The gap may be at greater than a radius of a vehicle tyre of a vehicle for which the tow hitch assembly may be intended.

The non-compressed length may be greater than 350 mm and wherein, in the standard configuration, greater than approximately 900 mm of the elongate sliding member may be located proximal the sleeve.

The gap may be greater than 400 mm.

The gap may be greater than 500 mm.

In the recovery configurations, the tow hitch faster may be able to travel greater than 700 mm.

The sleeve may comprise a proximal flange.

The hitch fastener may comprise a right angle mounted tow ball.

The compression member may comprise a compression spring wrapped around the elongate sliding member.

The compression spring may be fastened to a proximal region of the compression member.

The locking mechanism may comprise a peg and aperture arrangement and wherein the aperture arrangement may comprise the sleeve and the elongate sliding member comprising respective apertures which collocate at a retracted position of the elongate sliding member.

The elongate sliding member may be telescopic and comprising outer and inner telescopic members and a travel limitation mechanism operative between the outer and inner telescopic members configured for limiting the travel of the inner telescopic member with respect to the outer telescopic member.

The travel limitation mechanism may comprise an interior inelastic cord.

In the recovery configuration, the hitch fastener may be able to travel greater than 1500 mm.

The locking mechanism may comprise a peg and aperture arrangement and wherein the aperture arrangement may comprise the sleeve and each of the telescopic members comprising respective apertures which collocate at retracted positions of the telescopic members.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 3 illustrates the standard and recovery configurations of the tow hitch assembly;

DESCRIPTION OF EMBODIMENTS

Figure 1:
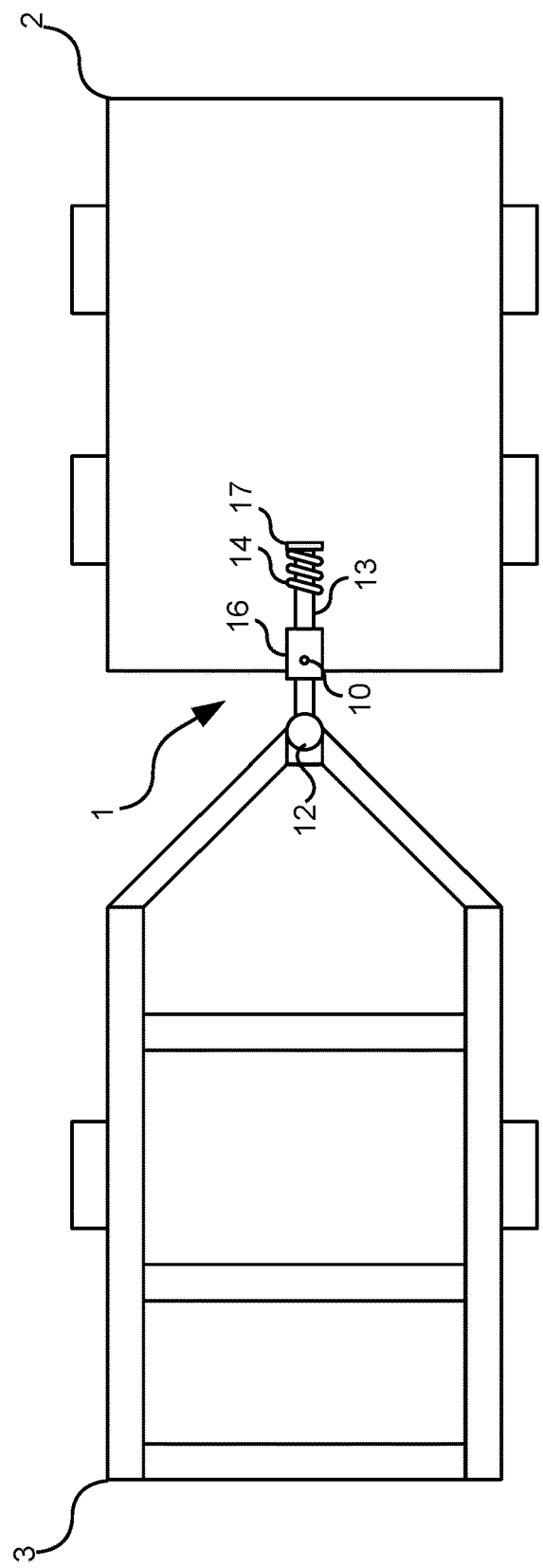
FIG. 1 shows a vehicle-bourne recovery tow hitch assembly in accordance with an embodiment.

FIG. 1 shows an exemplary recovery tow hitch assembly 1 in accordance with an embodiment. As can be seen, the tow hitch assembly 1 is utilised between a vehicle 2 and a trailer 3 each of which may be of differing types within the purposive scope of the embodiments described herein.

The tow hitch assembly 1 comprises an elongate sliding member 13 slidably retained within a vehicle affixed sleeve 16. The sliding member 13 has a hitch fastener 12 at a distal end thereof and a stop 17 at an opposite proximal end (i.e. proximal the vehicle) thereof.

For illustrative convenience, "proximal", as used herein, describes towards the vehicle and "distal" refers to towards the trailer.

Furthermore, the tow hitch assembly 1 comprises a compression member 14 operative between the stop 17 and the sleeve 16.

The tow hitch assembly 1 further comprises a locking mechanism 10 for locking the tow hitch assembly in a standard configuration wherein the sliding member 13 is locked relative to the sleeve 16.

When the locking mechanism 10 is unlocked, the tow hitch assembly assumes a recovery configuration wherein the sliding member 13 is free to slide with respect to the sleeve 16

In the recovery configuration, tow pulling force applied to the hitch fastener 12 pulls the sliding member 13 from the sleeve 16 until the compression member 14 is compressed between the stop 17 and the sleeve 16.

Figure 2:
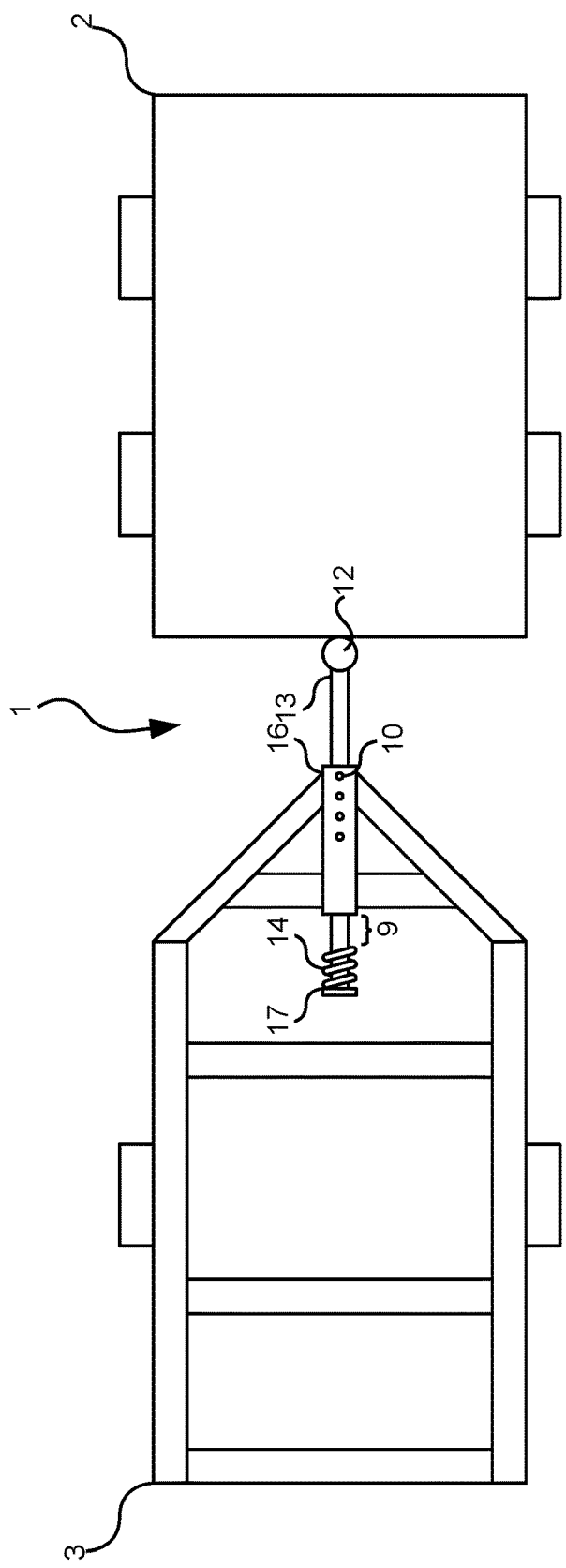
FIG. 2 shows a trailer-bourne recovery tow hitch assembly in accordance with a further embodiment.

FIG. 2 shows a further embodiment wherein the tow hitch assembly 1 is trailer-bourne. In a similar manner, the tow hitch assembly 1 in accordance with this embodiment comprises a trailer-bourne sleeve 16 within which the elongate sliding member 13 slides. The trailer born embodiment of FIG. 2 may be utilised specifically for trailer types routinely utilised in bogging prone environments, such as surf boat trailers and the like allowing for utilisation of conventional vehicle tow hitches.

FIG. 3 exemplifies the standard and recovery configurations of the tow hitch assembly 1. The embodiment shown in FIG. 3 shows the trailer-borne configuration but it should be appreciated that these configurations are equally applicable to the vehicle-bourne configuration as is substantially shown in FIG. 1.

FIG. 3A shows the tow hitch assembly 1 in the standard configuration wherein the elongate sliding member 13 is locked with respect to the sleeve utilising the locking mechanism 10. The locking mechanism 10 shown in FIG. 3 may comprise a peg and aperture arrangement. The aperture arrangement may comprise corresponding overlapping apertures within the sleeve 16 and the elongate sliding member 13 through which the peg may be inserted at discrete offsets of the sliding member 13 with respect to the sleeve 16. In the embodiment shown in FIG. 3, a plurality of apertures are shown so as to allow the locking mechanism to lock the sliding member 13 with respect to the sleeve 16 at a plurality of offsets. However, in embodiments, the locking mechanism 10 may be configured for locking the elongate sliding member 13 with respect to the sleeve 16 at one position wherein, where the locking mechanism 10 comprises a peg and aperture arrangement, a single aperture would be provided through both the sleeve 16 and the elongate sliding member 13.

As such, in the standard configuration as a substantially shown in FIG. 3A, the tow hitch assembly 1 may be utilised as a normal conventional tow hitch assembly.

However, when requiring bogged vehicle/trailer recovery, the configuration of FIG. 3B may be utilised. Specifically, the trailer 3 may be towed by the vehicle 2 in the standard configuration as is shown in FIG. 3A but, when becoming bogged, the locking mechanism 10 may be released.

As can be seen, and as alluded to above, the release of the locking mechanism 10 allows the elongate sliding member 13 to slide with respect to the sleeve 16.

As such, the vehicle 2 may be then driven initially without the pulling force of the trailer 2, advantageously assisting the freeing of the vehicle wheels until such time that the compression member 14 becomes operative between the stop 17 under sleeve 16 at which time gradually increasing force is applied to the trailer 3. As can be appreciated, the trailer wheel 3 may be freed both under the effects of the inertia of the vehicle 2 and the potential energy stored within the compression member 14.

Ideally, in the standard configuration as is shown in FIG. 3A, the compression member 14 leaves a gap 9 between the compression member 14 and the sleeve 16 such that the compression member 14 only applies force once the vehicle tyres have become substantially freed from their respective depressions. In other words, the gap 9 allows sufficient travel so as to allow the vehicle wheels to substantially freed themselves prior force being exerted by the trailer 3.

In alternative embodiments, as opposed to relying on the gap 9 for such purpose, the resilience of the compression member may be configured such that the forces applied thereby only become significant once the vehicle wheels have become freed. In other words, the compression member 14 may extend further along the proximal portion of the elongate sliding member 13 to the sleeve 16, including, in one embodiment, leaving no gap, but, wherein, the compressive resilience of the compression member 14 only becomes significant at an extension beyond which the vehicle is free.

FIG. 4 illustrates the ability to free the vehicle wheels 2 prior application of towing force from the trailer 3.

Figure 4A:
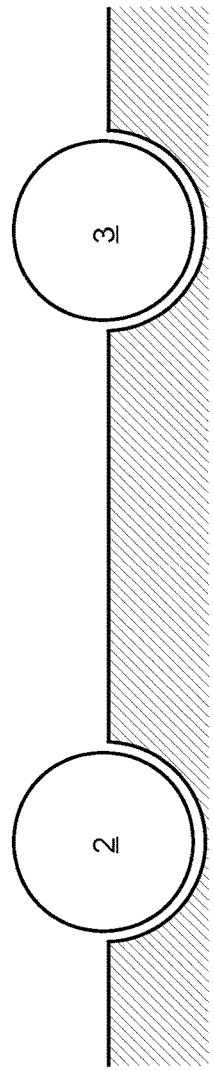
FIG. 4 illustrates the freeing of vehicle wheels independent of those of the trailer.

FIG. 4A shows a scenario when both the vehicle wheels 2 and the trailer wheels 3 have become bogged in sand.

Figure 4B:
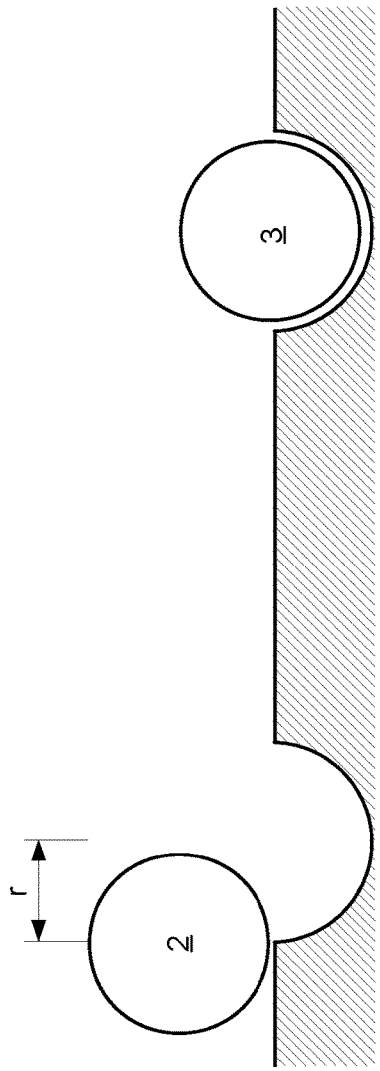

As such, by unlocking the locking mechanism 10, the vehicle 2 is able to be driven forwards as is substantially shown in FIG. 4B devoid of trailer pulling force.

As alluded to above, ideally the gap 9 is sufficient so as to allow the vehicle wheels 2 to travel a distance of greater than the radius of the vehicle wheels 2 so as to allow the vehicle wheels 2 to escape the depression prior the compression member 14 exerting force on the sleeve 16.

Figure 4C:
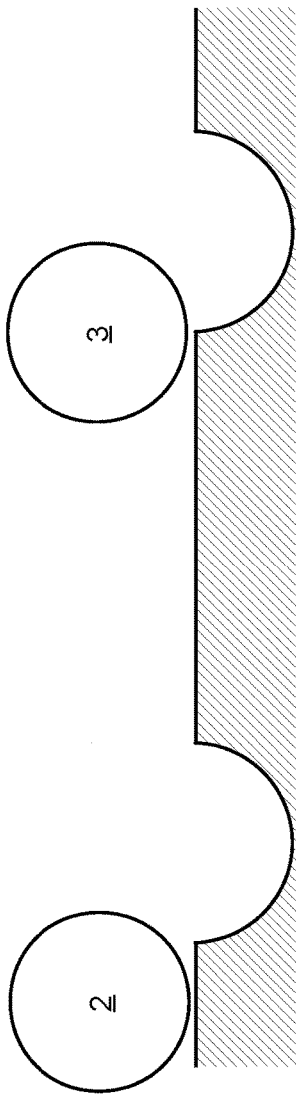

FIG. 4C shows a scenario when force is applied by the compression member 14 on the sleeve 16 which is then able to pull the trailer wheels 3 from the depression after the vehicle wheels 2 have been freed. As alluded to above, the pulling force on the trailer 3 may comprise both a vehicle inertial and potential energy component thereby advantageously assisting the freeing of the trailer 3.

Figure 5:
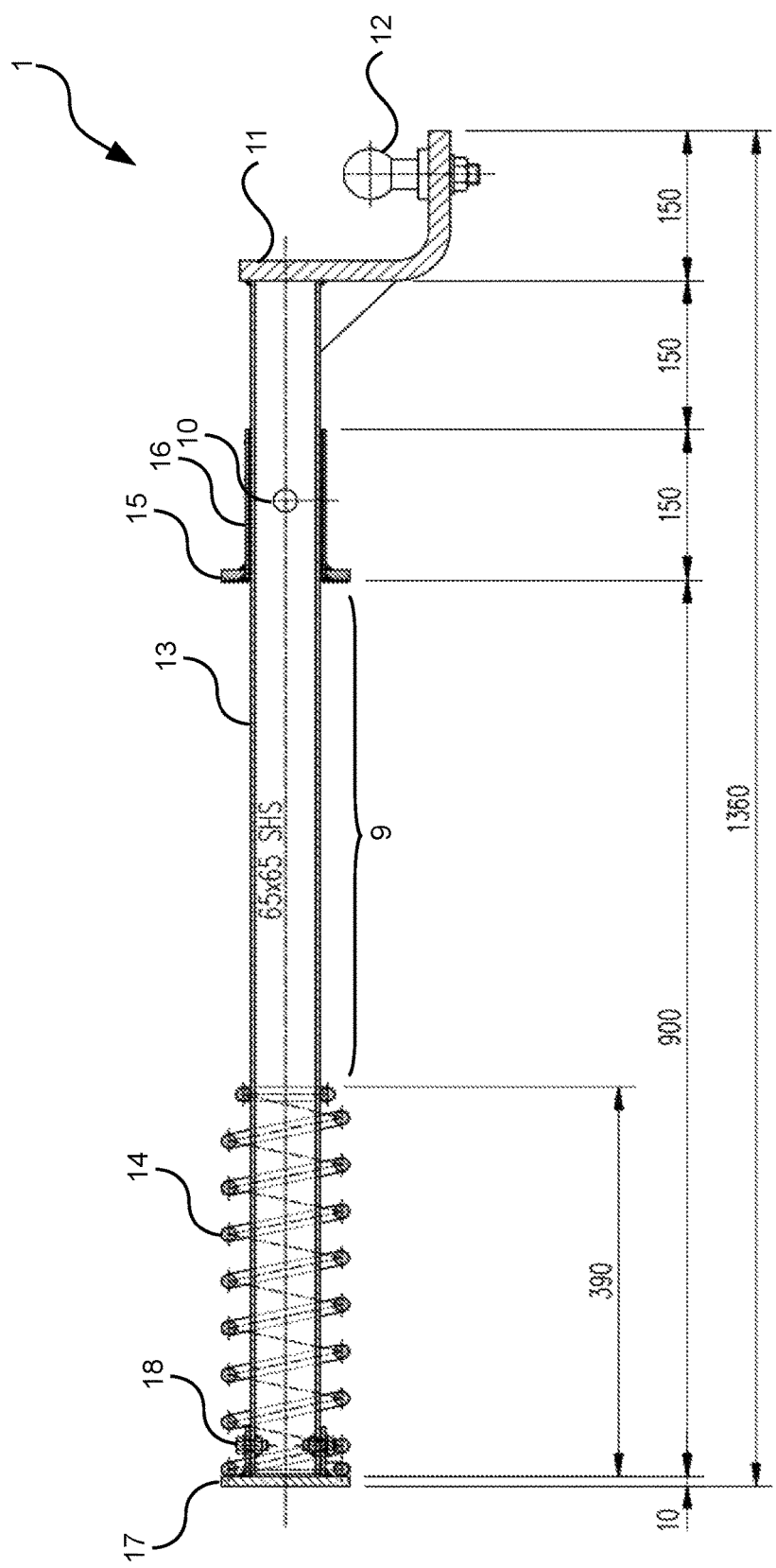
FIG. 5 shows a specific vehicle-bourne recovery tow hitch assembly in accordance with an embodiment in the standard configuration.
Figure 6:
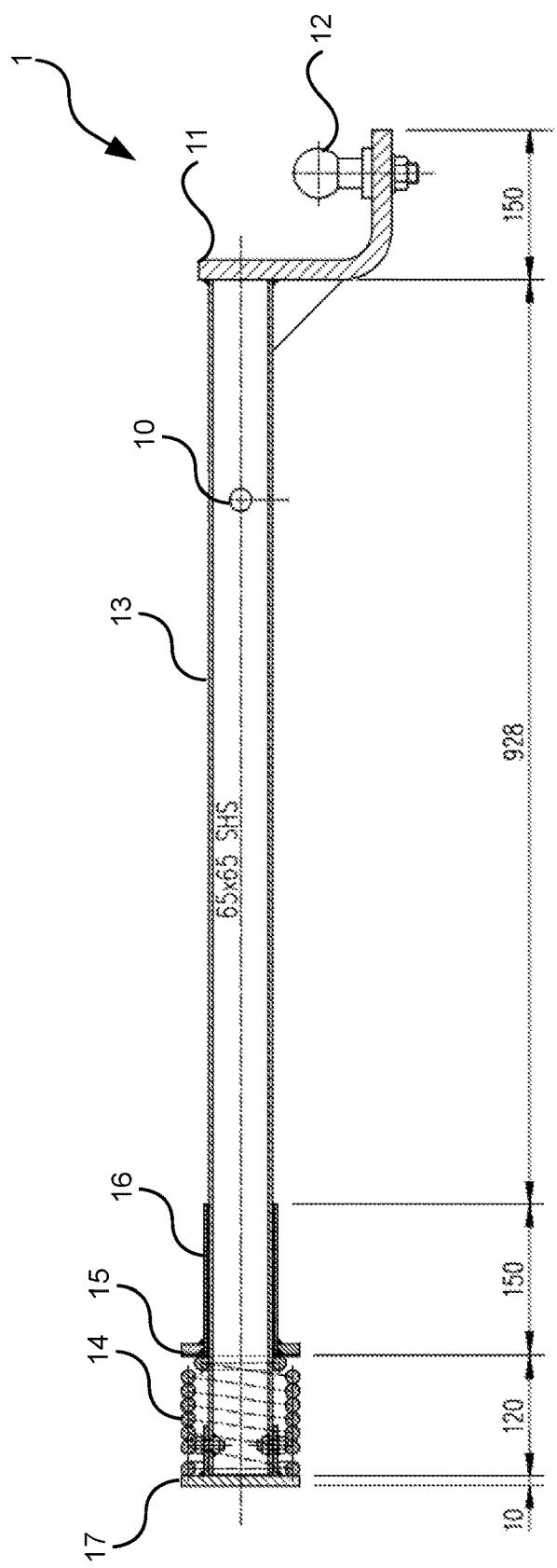
FIG. 6 shows the recovery tow hitch assembly of FIG. 5 in the recovery configuration.

FIGS. 5 and 6 show a specific embodiment of the tow hitch assembly 1 in accordance with the vehicle-bourne embodiment.

As can be seen, the tow hitch assembly 1 comprises the vehicle affixed sleeve 16 through which the elongate sliding member 13 is able to slide.

FIG. 5 shows the tow hitch assembly 1 in the standard configuration wherein the locking mechanism 10 is locked such that the sliding member 13 is fixed with respect to the sleeve 16.

Conversely, FIG. 6 shows the tow hitch assembly in the recovery configurations wherein the locking mechanism 10 is unlocked such that the sliding member 13 is able to slide through the sleeve 16.

Returning to FIG. 5, the elongate sliding member 13 may take the form of a 65×65 mm square bar and wherein the sleeve 16 similarly defines a corresponding square aperture for accommodating the square bar 13.

Teflon or other friction reducing material such as a plastic sleeve or the like may be located on the inner surface of the sleeve 16 so as to facilitate the sliding of the sliding member 13 therethrough.

The distal end of the sliding member 13 may comprise the hitch fastener which, in the embodiment comprises a conventional tow ball 12 affixed to a right angled bracket 11. Other types of fasteners or envisaged within the purposive scope of the embodiments provided herein however.

The proximal end of the elongate sliding member 13 comprises the stop 17, which, in accordance with this embodiment, comprises a plate 17.

As can be appreciated, in the standard configuration FIG. 4, the elongate sliding member 13 is located under the rear of the vehicle with the hitch fastener 12 extending from beyond the rear of the vehicle.

In accordance with this embodiment, the compression member 14 comprises a compression spring 14 which locates around a proximal portion of the elongate sliding member 13.

The compression member spring 14 may be held at the proximal end of the elongate sliding member 13 by way of a spring fastener 18.

As is also shown, when in the standard configuration, in a preferred embodiment, the compression member spring 14 leaves a spacing gap 9 between the compression member 14 and the sleeve 16 so as to allow the freeing of the vehicle wheels firstly in the manner described above with reference to FIG. 4. As alluded to above, the spacing gap 9 may be approximately greater than the radius of the vehicle wheels. As such, differing spacing gaps 9 may be configured depending on the type of vehicle, vehicle wheels and the like.

As is also shown in FIG. 4, the proximal end of the sleeve 16 may similarly comprise a flange 15 against which the distal end of the compression member spring 14 abuts.

As is shown in FIG. 5, in the recovery configuration, when the locking mechanism 10 has been unlocked, force applied to the hitch fastener 12 of the tow hitch assembly 1 allows the elongate sliding member 13 to slide from the sleeve 16 until such time that the compression member spring 14 may be fully compressed between the stop 17 and the flange 15 of the sleeve 16.

When fully compressed in this manner, in certain situations, an inertial jerk may be applied to the tow hitch assembly 12 which jerks the trailer 3 from the depression and wherein the potential energy stored within the compression member 14 further assists in the freeing of the trailer 3 wheels.

For the embodiment shown in FIGS. 5 and 6, it is envisaged that the hitch fastener 12 may travel up to approximately 800 mm (or 778 mm in one specific embodiment).

Furthermore, in the particular embodiment shown in FIG. 5, the compression member 14 may have a non-compressible length of approximately 390 mm and wherein, in the standard configuration, the elongate sliding member 13 has a proximal length of approximately 900 mm between the stop plate 17 and the flange 15, thereby leaving a gap of approximately 510 mm.

For example, 31" 4×4 tyres may have a radius of 394 mm, being less than the gap of 510 mm.

Furthermore, in the embodiment shown, the sleeve 16 may comprise a length of approximately 150 mm and wherein, in the standard configuration, approximately 150 mm of the elongate sliding member 13 may be exposed from the distal end of the sleeve 16.

In embodiments, the various dimensions provided herein may be modified according to differing applications, vehicle sizes, trailer sizes, load sizes and the like.

Figure 7:
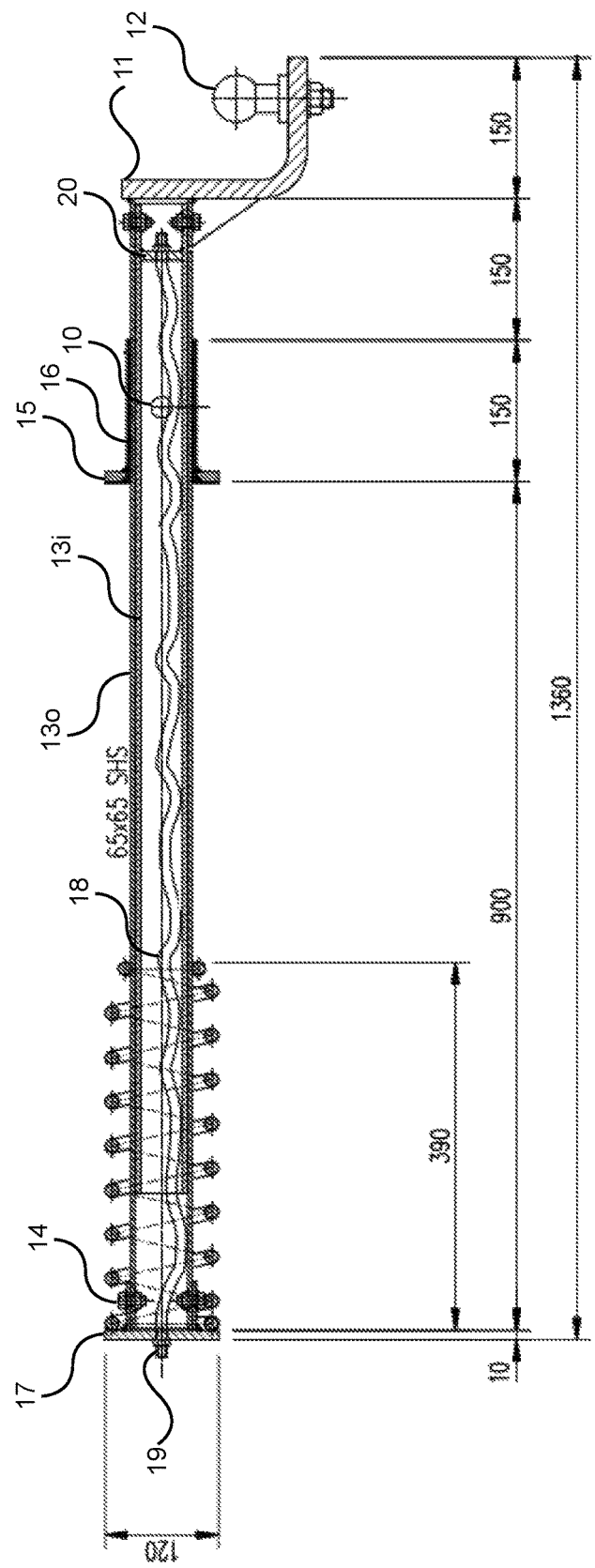
FIGS. 7 and 8 show respective standard and recovery configurations of a further extendable recovery tow hitch assembly having greater reach on account of a telescopic elongate sliding member arrangement in accordance with an embodiment.
Figure 8:
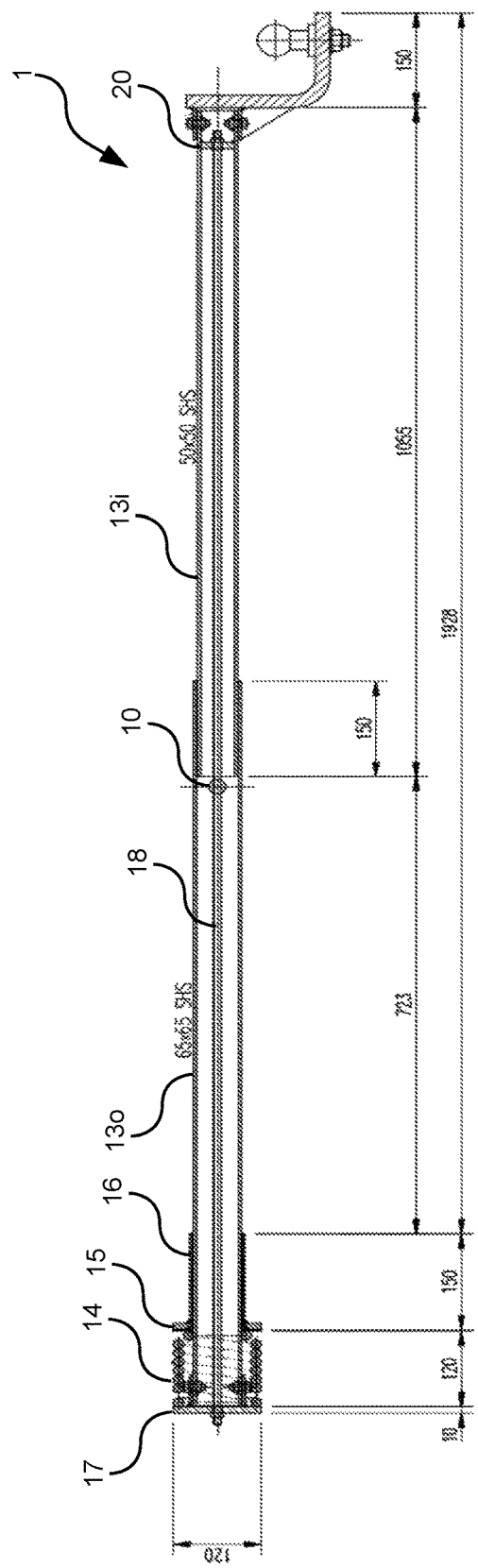

FIGS. 7 and 8 show an embodiment of the tow hitch assembly 1 having a greater hitch fastener 12 displacement.

Specifically, in accordance with this embodiment, the hitch faster 12 may travel up to approximately 1600 mm (1628 mm on one specific embodiment). In alternative embodiments, the telescopic arrangement may be utilised to address space limitations under the rear of the vehicle 2 and have a lesser displacement.

Such is achieved by the elongate sliding member 13 being telescopic. Specifically, as can be seen, the elongate sliding member 13 comprises an outer telescopic member 130 and an inner telescopic member 13*i* being telescopically arranged.

The displacement of the inner telescopic member 13*i* may be limited with respect to the outer telescopic member 130 utilising a travel limitation mechanism.

In the embodiment shown in FIGS. 7 and 8, the travel limitation mechanism comprises an interior non-elastic cord 18, such as one of sufficient resilience, such as one being made from winch cord or cable.

As can be seen, the cord or cable 18 may be fastened between the stop 17 utilising fastener 19 and a corresponding distal fastener plate 20.

In embodiments, the cord 18 may be sheathed or otherwise covered or protected so as to reduce fraying, such as adjacent the sleeve 16 on account of the locking mechanism 10 or the like.

FIG. 7 shows when the tow hitch assembly 1 is fully extended and the cable 18 is taught.

In embodiment, the inner telescopic member 13*i* maybe distally located with respect to the outer telescopic member 130. Furthermore, the interior void of the sleeve 16 may be sufficient so as to accommodate the outer telescopic member 130.

Furthermore, for this embodiment, where the locking mechanism 10 takes the form of a peg and aperture arrangement, collocating apertures may penetrate both the outer and inner telescopic members 130, 13*i* so as to be able to lock both at a desirous retracted configuration as is a substantially shown in FIG. 7.

In embodiments, when recovery is not required, a conventional hitch fastener 12 may be fastened directly to the rear stop plate 17.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A recovery tow hitch assembly comprising:
   an elongate sliding member being slidably retained within a vehicle-affixed sleeve, the sliding member having a hitch fastener at a distal end thereof and a stop at an opposite proximal end;
   a compression member operative between the stop and the sleeve; and
   a locking mechanism for locking the tow hitch assembly in a standard configuration wherein the sliding member is locked relative to the sleeve and wherein, when the locking mechanism is unlocked, the tow hitch assembly assumes a recovery configuration wherein the sliding member is able to slide with respect to the sleeve and wherein tow pulling force applied to the hitch fastener pulls the sliding member from the sleeve to compress the compression member between the stop and the sleeve, wherein the compression member comprises a non-compressed length and wherein, in the standard configuration, the non-compressed length is configured to leave a gap between the distal end of the compression member and the sleeve.

2. A recovery tow hitch assembly as claimed in claim 1, wherein the gap is greater than a radius of a vehicle tyre of a vehicle for which the tow hitch assembly is intended.

3. A recovery tow hitch assembly as claimed in claim 2, wherein the non-compressed length is greater than 350 mm and wherein, in the standard configuration, the gap is greater than approximately 900 mm.

4. A recovery tow hitch assembly as claimed in claim 1, wherein the gap is greater than 400 mm.

5. A recovery tow hitch assembly as claimed in claim 1, wherein the gap is greater than 500 mm.

6. A recovery tow hitch assembly as claimed in claim 1, wherein, in the recovery configurations, the tow hitch fastener is able to travel more than 700 mm.

7. A recovery tow hitch assembly as claimed in claim 1, wherein the sleeve comprises a proximal flange.

8. A recovery tow hitch assembly as claimed in claim 1, wherein the hitch fastener comprises a right angle mounted tow ball.

9. A recovery tow hitch assembly as claimed in claim 1, wherein the compression member comprises a compression spring wrapped around the elongate sliding member.

10. A recovery tow hitch assembly as claimed in claim 9, wherein the compression spring is fastened to a proximal region of the compression member.

11. A recovery tow hitch assembly as claimed in claim 1, wherein the locking mechanism comprises a peg and aperture arrangement and wherein the aperture arrangement comprises the sleeve and the elongate sliding member comprising respective apertures which collocate at a retracted position of the elongate sliding member.

12. A recovery tow hitch assembly as claimed in claim 1, wherein the elongate sliding member comprises outer and inner telescopic members and a travel limitation mechanism operative between the outer and inner telescopic members configured for limiting the travel of the inner telescopic member with respect to the outer telescopic member.

13. A recovery tow hitch assembly as claimed in claim 12, wherein the travel limitation mechanism comprises an interior inelastic cord.

14. A recovery tow hitch assembly as claimed in claim 12, wherein, in the recovery configuration, the hitch fastener is able to travel greater than 1500 mm.

15. A recovery tow hitch assembly as claimed in claim 12, wherein the locking mechanism comprises a peg and aperture arrangement and wherein the aperture arrangement comprises the sleeve and each of the telescopic members comprising respective apertures which collocate at retracted positions of the telescopic members.

* * * * *